United States Patent
Todaro

[11] 3,893,199
[45] July 8, 1975

[54] COMBINATION TOOL FOR WIRE CUTTING AND STRIPPING

[76] Inventor: Anthony Todaro, 47 Priscilla Ave., Deer Park, N.Y. 11729

[22] Filed: Sept. 20, 1974

[21] Appl. No.: 507,967

Related U.S. Application Data

[63] Continuation-in-part of Ser. No. 373,861, June 26, 1973, abandoned.

[52] U.S. Cl. ...................... 7/5.6; 81/9.5 R; 30/258
[51] Int. Cl.² ...................... B25B 7/22; H02G 1/12
[58] Field of Search ......... 81/9.5 R, 302; 7/5.5, 5.6; 30/258, 90.1, 261

[56] References Cited
UNITED STATES PATENTS

| 529,488 | 11/1894 | Gile | 30/90.1 X |
| 838,706 | 12/1906 | Fuller | 81/9.5 R |
| 1,388,398 | 8/1921 | Adams | 30/90.1 |
| 2,616,315 | 11/1952 | Caldwell | 81/302 X |
| 2,990,735 | 7/1961 | Manning | 7/5.5 X |
| 3,403,441 | 10/1968 | Eubanks | 30/90.1 |

*Primary Examiner*—James L. Jones, Jr.
*Attorney, Agent, or Firm*—Richard L. Miller

[57] ABSTRACT

A combination tool for wire cutting and wire stripping, having a pair of pivoted arms which extend across the pivot into a pair of jaws. Each of the jaws includes a wire stripping edge and a wire cutting edge. The arms are biased for keeping the stripping edges in abutting relationship while simultaneously keeping the cutting edges in spaced relationship. When force is applied against the bias, the cutting edges will cut a piece of wire and simultaneously the stripping edges will be spaced apart, whereby the cut wire can then be inserted between the stripping edges. When the force is subsequently released, the stripping edges will sever the insulation on the wire without cutting the metal wire core. The wire can then be pulled out of the tool whereby the insulation will be stripped off from the wire.

10 Claims, 9 Drawing Figures

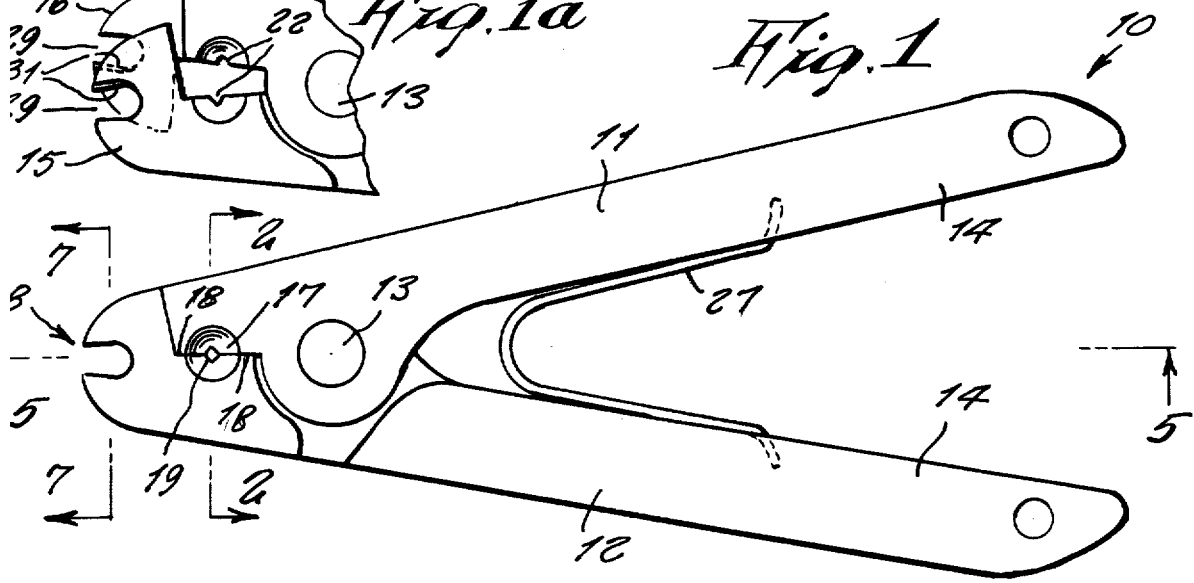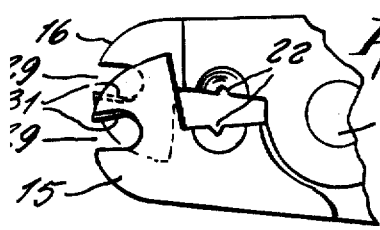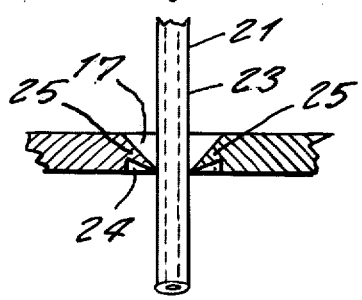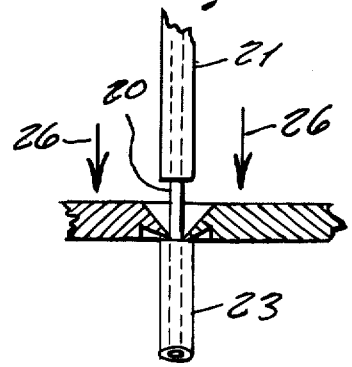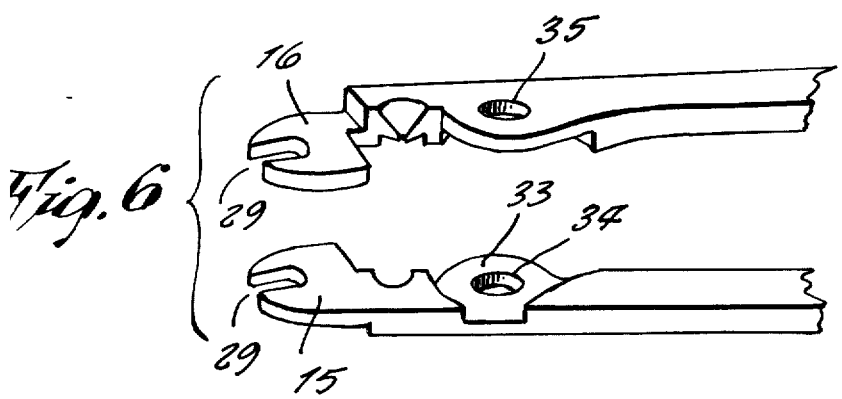

3,893,199

COMBINATION TOOL FOR WIRE CUTTING AND STRIPPING

RELATIONSHIP TO OTHER APPLICATIONS

This application is a continuation-in-part application of Ser. No. 373,861, now abandoned, filed by the applicant of the present invention on June 26, 1973.

BACKGROUND OF THE INVENTION

This invention relates generally to a tool and more specifically to a tool which can be used for wire cutting and wire stripping.

One of the most important aspects of an electrician's job is to cut and strip electrical wire. In order to accomplish this, electricians frequently use a separate tool for the cutting and a separate tool for the stripping. However, this process becomes quite cumbersome and is often difficult for the electrician to switch the tools in the midst of a specific wiring operation. Accordingly, numerous combination tools are available which includes different parts which can be utilized by the electrician during the course of his work. These combination tools may in fact include wire cutters as well as strippers. However, in utilizing such combination tools it becomes awkward to manipulate the tool to its different parts. Sometimes it requires the electrician to invert the tool, or he must operate the tool in a complicated manner.

It is therefore an object of the present invention to provide a combination tool of an improved type that is easily adaptable for use in both cutting and stripping wire.

Another object of the present invention is to provide a tool which includes a biasing means which biases the tool to have the cutting edges in a normally open position.

Yet another object of the present invention is to provide a tool which includes wire strippers wherein a biasing force automatically serves to strip wire.

A further object of the present invention is to provide a tool which easily removes the insulation from the wire without injuring the wire core, which makes a clean cut of the insulation, and serves to pull the insulation from the core without slipping.

Still another object of the present invention is to provide a tool which includes wire stripping as well as wire cutting functions, and wherein a biasing arrangement is provided such that a single application of force against the biasing means will serve to cut wire inserted between the wire cutters, while releasing the force will serve to strip wire inserted between the wire strippers.

Yet a further object of the present invention is to provide a tool for wire stripping wherein the wire stripping edges are so arranged as to hog into the wire, whereby the biasing force causes the edges to strip the wire without harming the metal core.

A further feature of the present invention is to provide a tool which includes wire cutting edges, whereby the wire cutting edges cannot be vertically spread apart and separated from each as a result of a large bulk of wire being inserted between the edges.

A further object of the present invention is to provide a combination tool for wire cutting and wire stripping which is simple in design, inexpensive to manufacture, rugged in construction, easy to use and efficient in operation.

These and other objects, features and advantages will, in part, be pointed out with particularity, and will, in part, become obvious from the following more detailed description of the invention, taken in conjunction with the accompanying drawings which form an integral part thereof.

SUMMARY OF THE INVENTION

Briefly, the invention comprises a combination wire cutter and wire stripper including a pair of pivoted arms which are positioned on opposite sides of a longitudinal center line passing through the pivot. A pair of jaws are formed as extensions of each of said arms; each of the jaws including a first portion located on the same side of the center line as does the arm from which that jaw extends, and a second portion extending onto the opposite side of the center line. The first portions each include an abutting face. The second portions each include an aligned notched section. A pair of cooperating stripping edges are located on respective ones of the abutting faces of the first portion of the jaws. A pair of cooperating cutting edges are located on respectively opposite sides of the notched sections of the second portions of the jaws. A biasing means positioned between the arms biases the stripping edges in abutting relationshipe while simultaneously biasing the cutting edges in spaced relationship. As a result, when force is applied against the bias, the cutting edges will cut a piece of wire placed therebetween, while the stripping edges will be opened. When the force is subsequently released, the stripping edges will strip a piece of wire which is placed therebetween.

BRIEF DESCRIPTION OF THE DRAWING

In the drawing:

FIG. 1 is a side view of the invention shown with jaws closed;

FIG. 1a is a detail of a same view as in FIG. 1, which shows the jaws open;

FIG. 2 is a cross-section taken along line 2—2 of FIG. 1;

FIGS. 3 and 4 are sectioned views of the stripping arrangement shown in FIG. 1, and indicates operational steps in the stripping of the wire;

FIG. 5 is a cross-section taken along line 5—5 of FIG. 1;

FIG. 6 is a perspective exploded view of the parts of the device from the FIG. 1;

FIG. 7 is a cross-sectional view taken along line 7—7 of FIG. 1, and

FIG. 8 is a view similar to that of FIG. 7 and showing the jaws spread open.

DESCRIPTION OF THE PREFERRED EMBODIMENT

Referring now to the drawing, the combination tool of the present invention is shown generally at 10 and includes a pair of arms 11 and 12 which are pivoted together by a common rivet 13 or the like, along a longitudinal center line which separates the two arms into upper and lower arms. The arms form cooperative handles 14 for being squeezed in a persons hand. The arms extend past the pivot to form cooperative jaws 15 and 16. Each of the jaws include a first portion which is positioned on the same side of the center line as does the arm from which that jaw extends. Each of these first portions of the jaw includes an abutting face 18 which includes the wire stripping edges 22. The jaws further include a second portion which continues from the first portion and extends onto the opposite of the center line. The second portions include the wire cutting arrangement 28 which is formed by means of the notches 29 in each of the jaws. The notches are in an aligned relationship. Each of the notches have one surface thereof formed as a cutting edge. The cutting edges 31 are so arranged as to be on opposite sides of the notches. Thus, one jaw has the cutting edge 31 on the upper part of the notch while the other jaw has the cutting edge on the lower part of the notch.

A biasing device 27, shown by way of example as a leaf spring, is placed between the arms 11, 12. The biasing device acts to keep the stripping edges in an abutting relationship while simultaneously keeping the cutting edges in spaced relationship from each other.

In order to appreciate the novel features of the present invention it is necessary to distinguish between the action of a pair of scissors or pliers on the one hand, and the action of a clamp on the other hand. A pair of scissors or pliers includes two arms pivoted at a point along a longitudinal center line, and wherein each of the arms extends into a jaw. The jaws include a facing cutting edge. The cutting edge, however, is on the opposite side of the longitudinal center line then is the arm from which that jaw extends. As a result, when the arms are spread apart and opened, the jaws also will open. When the arms are drawn together and closed, the jaws likewise close.

In distinction to this, there is the action of a clamp. A clamp also comprising pivoted arms having the pivot existing along the longitudinal center line. The arms extend into jaws which include clamping edges which also face each other. In the case of a clamp however, the clamping edges are located on the same side of the center line as the arm from which that jaw extends. As a result, in the case of a clamp, when the arms are opened and spread apart, the jaws are closed. On the other hand, when the arms are drawn together, the jaws are opened.

If a biasing means is provided between the arms of a scissor, the biasing means would tend to keep the jaws apart. The force exerted against the biasing means would tend to close the jaws thereby providing a cutting action between the cutting edges of the jaws. On the other hand, if the biasing means were placed between the arms of a clamp, the biasing means would tend to keep the jaws of the clamp abutting each other to grasp something. Force applied against the biasing action serves to open the jaws to insert or release objects.

The combination tool of the present invention utilitizes both the scissor type action, as well as the clamping type action, on a single device, to provide an improved and unexpected result. The wire stripping edges 22 are placed on the jaws such that it is on the same side of the center line as is the arm from which that jaw extends. This is similar to the clamping action. At the same time, a scissors action is provided by using the cutting edges 31, wherein the cutting edges are placed on the opposite side of the center line as is the arm from which the jaw extends.

In utilizing the arrangement of the present invention, it is possible to have a single biasing device which keeps the stripping edges in a normally abutting relationship, while at the same time, the same biasing means serves to keep the cutting edges 31 in a spaced relationship. In this manner the combination tool of the present invention can be utilized for both cutting and stripping in a single action. Thus, in using the present invention the electrician would insert the wire to be cut between the cutting edges in the notch 29. By applying a force against the biasing spring 27, the wire would be cut. At the same time as the wire is cut, the same force against the biasing spring 27 serves to spread apart the stripping edges 22. As soon as the wire is cut and while holding the force against the biasing spring, the wire can be inserted between the now spaced apart stripping edges. When the force is then released, the stripping edges will close onto the wire and, by means of the biasing force of the spring 27, will serve to cut the insulation on the wire. The wire can then be pulled out from the tool and will be automatically stripped. Thus, with a single action against the biasing spring 27, it is possible to both cut and strip the wire. This provides a simplified action and avoids any inconvenience to an electrician utilizing the combination tool of the present invention.

An additional feature of the present invention is with regard to the specific construction of the wire stripping edges 22. The stripping edges are formed by means of a downward sloping section 17, extending from the upper surface of each of the jaws to the abutting faces 18. At the same time, an upwardly sloping surface extends from a bottom part of the abutting face 18 into the lower part of the jaw 25. An apex 25 is thereby formed between the two sloping surfaces. This apex forms the stripping edge along the abutting face of the jaw. In one embodiment, the sloping section 17 includes a semi-circular region of the jaw, thereby forming a semi-conical surface. The lower sloping section is shown formed by removal of a semi-conical section from the lower part of the jaw. However, the depressions 17 and 24 need not be semi-circular, but could also be formed as part of a square, hexagonal, octagonal, or any other convenient shape which might be easier to manufacture without violating the spirit of this invention.

At the stripping edge, there is formed a small notch 19 which serves to align and grip the insulation 23 on a wire 21, whereby the wire is centered at the apex of the blades 25. The stripping edges 22 are sharp to serve as a severing blade in order to cut through the insulation sheathing 23 of the wire 21.

In use, as shown in FIGS. 2 and 5, when the jaws are released so that they close around the cable 21, they grip and center the wire so that when the jaws are urged in the direction of the arrows 26, as shown in FIG. 4, the cutting edges sever through the insulation due to their shape, in combination with the biasing action of the spring. The cut insulation can then be pulled off as the wire is removed from the tool.

The wire cutter 28 formed by the cooperating notches 29 within each of the jaws, have the cutting edges 30 at an acute angle, as shown in cross-section, to form the cutting edges 31. As shown in FIGS. 7 and 8, when the jaws are moved into a direction as shown by arrows 32, the cutting edges 31 cut across a wire placed in the notch.

The jaws are so arranged to have the second portions, which extend onto the other side of the center line, in an offset relationship. Furthermore, the jaws overlap each other above and below the center surface line 33, which is perpendicular to the axis of pivot rivet 13 and its respective bearing pivot surfaces 34 and 35, as shown in FIGS. 5 and 6. Thus, as shown in FIG. 6, the second portion of one jaw 15 will overlie the second portion of jaw 16. As a result, when a wire of excessive bulk is placed between the cutting edges of the jaw, it will be impossible for the jaws to separate from each other. On the contrary, with normal cutting devices, such as scissors, when a very thick bulk material is placed between the jaws there is a tendency for the jaws to separate. This is prevented by the offset and overlapping feature of the present device.

There has been disclosed heretofor the best embodiment of the invention presently contemplaced. However, it is understood that various changes and modifications may be made thereto without departing from the spirit of the invention.

What is claimed is:

1. A combination wire cutter and wire stripper comprising:
    a pair of pivoted arms, said arms being positioned on opposite sides of a longitudinal center line passing through the pivot;
    a pair of jaws each extending from a respective one of said arms, each of said jaws including a first portion located on the same side of the center line as does the arm from which that jaw extends, said first portions having aubtting faces, and a second portion extending onto the opposite side of the center line, said second portions each including an aligned notched section;
    a pair of cooperating stripping edges each located on a respective one of the abutting faces of the first portion of said jaws, a pair of cooperating cutting edges each located on a respective opposite side of said notched sections of said second portion, and biasing means for biasing said stripping edges in abutting relationship while simultaneously biasing said cutting edges in spaced relationship, whereby when force is applied against said bias, said cutting edges will cut and said stripping edges will be separated, and when the force is subsequently related said stripping edges will strip wire placed therein.

2. The combination as in claim 1 and where each of said first portions includes a downwardly sloping section extending from the upper surface of the haw to the abutting face, and an upwardly sloping surface extending from the abutting face into the lower part of the jaw, said two sloping sections forming said stripping edge along the abutting face of the jaw.

3. The combination as in claim 2 and wherein said sloping sections include a semi-circular region of the jaw thereby forming a semi-conical surface.

4. The combination as in claim 2 and wherein a notch is formed along the stripping edge of each jaw.

5. The combination as in claim 4 and wherein said notches lie along the longitudinal center line.

6. The combination as in claim 4 and wherein said notch is of rectangular shape.

7. The combination as in claim 1 and wherein the second portions of said jaws includes an offset arrangement having one part thereof on the same side as said first portion and the offset portion extending onto the other side.

8. The combination as in claim 7 and wherein said second portions vertically overlap each other thereby preventing separation of said jaws upon the insertion of a large bulk of material.

9. The combination of claim 1 and wherein said biasing means is in the form of a leaf spring positioned between said pair of arms.

10. The combination of claim 1 and wherein said pivot means is a rivet.

* * * * *